US009065887B2

(12) United States Patent
Chen et al.

(10) Patent No.: US 9,065,887 B2
(45) Date of Patent: Jun. 23, 2015

(54) METHOD, APPARATUS, AND SYSTEM FOR REDUCING POWER CONSUMPTION ON XDSL SUBSCRIBER BOARD

(71) Applicant: HUAWEI TECHNOLOGIES CO., LTD., Shenzhen (CN)

(72) Inventors: Liang Chen, Shenzhen (CN); Xiaodong Li, Shenzhen (CN); Fengbin Pan, Shenzhen (CN); Xueren Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/082,395

(22) Filed: Nov. 18, 2013

(65) Prior Publication Data
US 2014/0079104 A1 Mar. 20, 2014

Related U.S. Application Data

(63) Continuation of application No. PCT/CN2012/073165, filed on May 28, 2012.

(30) Foreign Application Priority Data

Aug. 19, 2011 (CN) .......................... 2011 1 0239942

(51) Int. Cl.
*H04M 3/00* (2006.01)
*H04L 12/28* (2006.01)
(Continued)

(52) U.S. Cl.
CPC .............. *H04M 3/007* (2013.01); *H04L 12/28* (2013.01); *H04M 3/30* (2013.01); *H04B 3/32* (2013.01); *H04M 11/062* (2013.01); *H04M 3/2209* (2013.01)

(58) Field of Classification Search
CPC ...... H04L 12/28; H04M 3/30; H04M 11/062; H04M 3/007; H04M 3/2209
USPC .................................. 375/222, 219; 327/108
See application file for complete search history.

(56) References Cited

U.S. PATENT DOCUMENTS 5,757,170 A * 5/1998 Pinney ........................... 323/266
6,075,821 A * 6/2000 Kao et al. ....................... 375/260
(Continued)

FOREIGN PATENT DOCUMENTS

CN 1595926 3/2005
CN 200959604 10/2007
(Continued)

OTHER PUBLICATIONS

Extended European Search Report issued Mar. 27, 2014, in corresponding European Patent Application No. 12792012.2.
(Continued)

*Primary Examiner* — Shuwang Liu
*Assistant Examiner* — Helene Tayong
(74) *Attorney, Agent, or Firm* — Staas & Halsey LLP

(57) ABSTRACT

A method for reducing power consumption on an xDSL subscriber board, includes: obtaining a maximum downlink service bandwidth, a downlink signal-to-noise ratio margin in line connection parameters of the user port, and transmission mode information in a line template bound to the user port; determining whether the downlink signal-to-noise ratio margin is larger than a preset value, if yes, reducing a maximum downlink nominal total transmission power; otherwise, configuring the maximum downlink nominal total transmission power as a downlink transmit power in line connection parameters of the current port; calculating a minimum undistorted power supply voltage required by a corresponding line driver of each registered user port under the current configuration of the bound template, comparing minimum undistorted power supply voltage values, to find the largest value; and controlling an output voltage of a power module of a line driver equaling to the largest value.

9 Claims, 4 Drawing Sheets

(51) Int. Cl.
*H04M 3/30* (2006.01)
*H04M 11/06* (2006.01)
*H04M 3/22* (2006.01)
*H04B 3/32* (2006.01)

(56) References Cited

U.S. PATENT DOCUMENTS

| | | | |
|---|---|---|---|
| 6,498,521 B1 * | 12/2002 | Bicakci et al. | 327/110 |
| 6,531,902 B1 * | 3/2003 | Tennen et al. | 327/108 |
| 8,344,761 B2 * | 1/2013 | Lakshmikumar et al. | 327/108 |
| 2001/0034851 A1 | 10/2001 | Randahl et al. | |
| 2006/0171527 A1 * | 8/2006 | Mills et al. | 379/395.01 |
| 2007/0086477 A1 | 4/2007 | Xiong et al. | |
| 2008/0043928 A1 | 2/2008 | Zhou | |
| 2010/0080380 A1 * | 4/2010 | Zhou et al. | 379/413 |

FOREIGN PATENT DOCUMENTS

| | | |
|---|---|---|
| CN | 101453336 | 6/2009 |
| CN | 102118518 | 7/2011 |
| CN | 202210827 | 5/2012 |
| WO | WO2007/027977 | 3/2007 |
| WO | 2010/039328 A1 | 4/2010 |

OTHER PUBLICATIONS

Chinese Office Action dated Aug. 4, 2014 in corresponding Chinese Patent Application No. 201110239942.1.
Chinese Search Report dated Jul. 24, 2014 in corresponding Chinese Patent Application No. 2011102399421.
*Asymmetric Digital Subscriber Line (ADSL) transceivers—Extended bandwidth ADSL2 (ADSL2plus)*, ITU-T G.992.5, Jan. 2009, pp. 1-137.
International Search Report, dated Jul. 5, 2012, in corresponding Chinese Application No. PCT/CN2012/073165 (7 pp.).
Written Opinion, dated Jul. 5, 2012, in corresponding Chinese Application No. PCT/CN2012/073165 (4 pp.).
International Search Report mailed Jul. 5, 2012, in corresponding International Application No. PCT/CN2012/073165.
"Very high speed digital subscriber line transceivers 2 (VDSL2)", Series G: Transmission Systems and Media, Digital Systems and Networks, Digital sections and digital line system—Access networks, Telecommunication Standardization Sector of ITU, G.993.2, Feb. 2006, 252 pp.

* cited by examiner

METHOD, APPARATUS, AND SYSTEM FOR REDUCING POWER CONSUMPTION ON XDSL SUBSCRIBER BOARD

CROSS-REFERENCE TO RELATED APPLICATIONS

This application is a continuation of International Application No. PCT/CN2012/073165, filed on Mar. 28, 2012, which claims priority to Chinese Patent Application No. 201110239942.1, filed on Aug. 19, 2011, both of which are hereby incorporated by reference in their entireties.

TECHNICAL FIELD

Embodiments of the present invention relate to the field of communications technologies, and in particular, to a method, an apparatus, and a system for reducing power consumption on an xDSL subscriber board.

BACKGROUND

A digital subscriber line (xDSL, Digital Subscriber Line) technology is a widely applied broadband access technology at present and supports Internet access of hundred millions of users around the world. There are a huge number of xDSL access devices and the annual power consumption of the xDSL access devices is quite huge. Not only carriers need to pay for huge operating costs every year, but also there are many carbon dioxide emissions, aggravating greenhouse effect and deteriorating the environment.

At present, to optimize a line transmit power of a user port on an xDSL subscriber board (also called board or line card), there are the following two methods:

Method 1: By limiting a maximum downlink noise margin of line and channel parameters in a template bound to a user port, it is ensured that a downlink signal-to-noise ratio margin (Signal-to-noise ratio Margin, SNRM) in line connection parameters does not exceed the limit value when a port is in Showtime state, so that a line transmit power of the user port is reduced, power consumption of a line driver (Line Driver, LD) is reduced, and finally power consumption reduction of an xDSL subscriber board is achieved.

Method 2: According to an output power of a line driver of a user port, the minimum undistorted power supply voltage of the line driver is determined, so as to control an output of a power module of the line driver to meet power transmission in the power, thereby achieving the objective of reducing power consumption of the line driver.

The inventor finds that the prior art has at least the following problems:

(1) Although method 1 can reduce power consumption of an xDSL subscriber board, a transmit power is reduced to a very limited degree and line driver power transmission efficiency is very low. In addition, many modems on the live network cannot support the feature of limiting Max SNRM, and there is an interworking problem.

(2) Although method 2 can reduce a power consumption of an xDSL subscriber board, method 2 just passively optimizes a power supply voltage of a line driver according to an output power. Therefore, the power consumption is reduced to a limited degree. In addition, when a plurality of line drivers uses the same power supply, the power supply needs to meet requirements of power transmission of all the line drivers. As a result, it is very difficult to reduce a power supply voltage and a better energy saving effect cannot be achieved.

SUMMARY

The present invention aims to provide a method, an apparatus, and a system for reducing power consumption on an xDSL subscriber board.

Embodiments of the present invention provide a method, an apparatus, and a system for reducing power consumption on an xDSL subscriber board.

A method for reducing power consumption on an xDSL subscriber board includes:

obtaining a maximum downlink service bandwidth that a registered user port provides for a user, a downlink signal-to-noise ratio margin SNRM in line connection parameters of the user port, and transmission mode information in a line template bound to the user port, and configuring line and channel parameters in a template bound to the registered user port;

determining whether the downlink SNRM is larger than a preset value, if yes, reducing the value of a maximum downlink nominal total transmission power in a template bound to a current port to reduce an excess SNRM; otherwise, configuring the maximum downlink nominal total transmission power in the template bound to the port as a downlink transmit power in line connection parameters of the current port;

calculating, according to the maximum downlink nominal total transmission power and transmission mode, a minimum undistorted power supply voltage required by a corresponding line driver of each registered user port under the current configuration of the bound template, and comparing minimum undistorted power supply voltage values, to find the largest value; and controlling an output voltage of a power module of a line driver equaling to the largest value.

A Digital Subscriber Line Access Multiplexer DSLAM includes:

a power module, configured to provide a power for a line driver on an xDSL subscriber board;

a chipset, configured to process a digital signal and perform digital/analog conversion and so on;

a plurality of line drivers, configured to increase a power for an analog signal provided by the chipset; and further including: an information collection and control unit, configured to collect port registration on an xDSL subscriber board, the maximum service bandwidth and preset transmission mode that a registered port needs to provide, and line connection parameters of the port in Showtime state, optimize, according to these information, a line transmit power of the registered user port, and control an output voltage of a power module to supply power of a line driver, so that the output voltage meets a minimum undistorted power supply voltage required when all line drivers on the subscriber board perform power transmission.

An xDSL system includes: a user computer, a Digital Subscriber Line modem, a network management device, and a Digital Subscriber Line Access Multiplexer, where the user computer is connected to the Digital Subscriber Line Access Multiplexer through the Digital Subscriber Line modem; the network management device collects port registration on an xDSL subscriber board, the maximum service bandwidth and transmission mode that a registered port needs to provide, and line connection parameters of the port in Showtime state; the Digital Subscriber Line Access Multiplexer optimizes, according to the information collected by the network management device, a line transmit power of a registered user port, and controls an output voltage of a power module of a line driver to supply power, so that the output voltage meets a minimum undistorted power supply voltage required when all line drivers on the subscriber board perform power transmission.

In the method, apparatus, and system for reducing power consumption on an xDSL subscriber board according to the embodiments of the present invention, when ensuring user service bandwidth requirements and line quality, a line transmit power of a registered user port on an xDSL subscriber board is optimized according to the maximum service bandwidth, transmission mode, and line connection parameters supported by the registered user port on the xDSL subscriber board, thereby greatly reducing power consumption on the xDSL subscriber board by cooperating with dynamic adjustment of a power supply voltage of a line driver.

DESCRIPTION OF EMBODIMENTS

Figure 1:
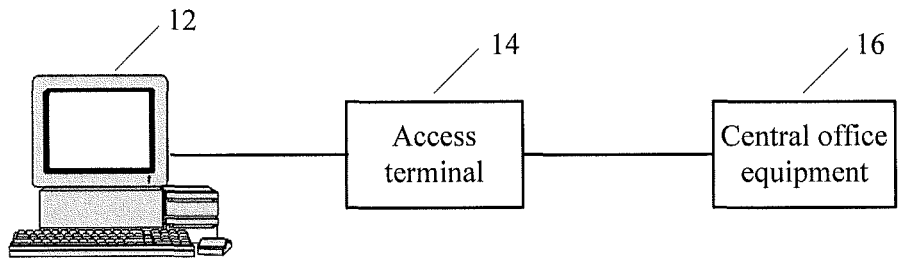
FIG. 1 is a schematic diagram of a system architecture according to the present invention.

As shown in FIG. 1, a network system of the present invention includes: a user computer 12, an access terminal 14, and a central office equipment 16. The user computer 12 is connected to the central office equipment 16 through the access terminal 14, and can send packets to the central office equipment 16 and simultaneously can receive packets from the central office equipment 16. The access terminal 14 is generally a Digital Subscriber Line modem (DSL Modem), and the central office equipment 16 may be a Digital Subscriber Line Access Multiplexer (DSLAM), and may also be an access device of another type.

Figure 2:
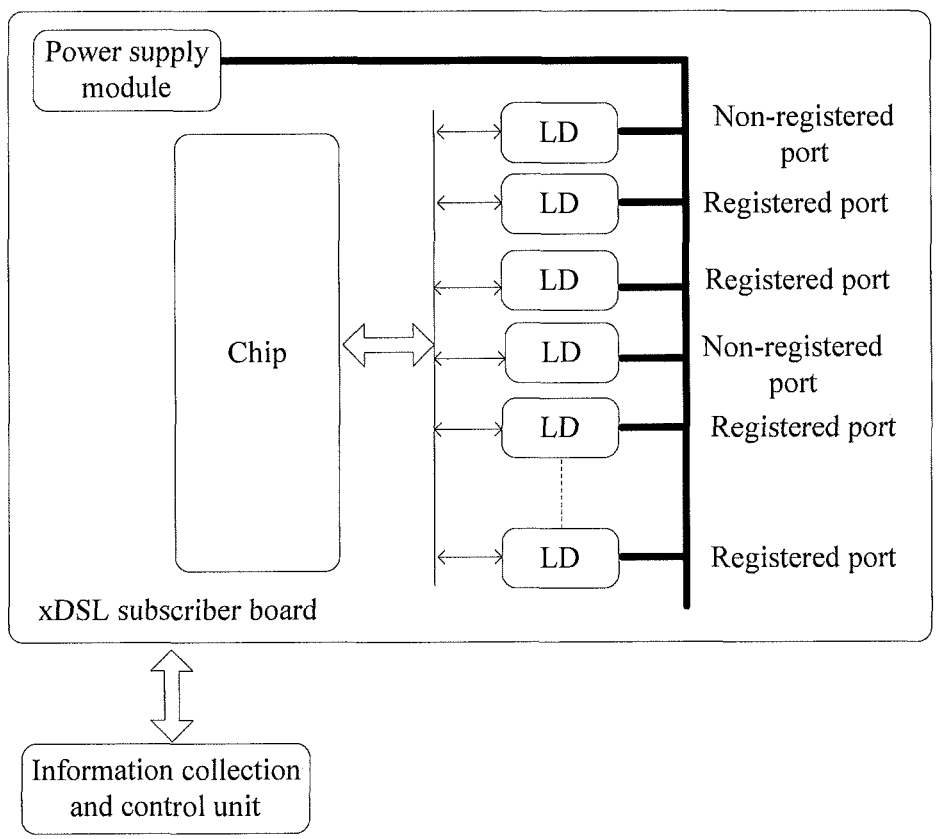
FIG. 2 is a schematic structural diagram of a DSLAM device according to the present invention.

As shown in FIG. 2, a DSLAM device of the present invention includes: an information collection and control unit, a power module to supply power, a chipset, and a plurality of line drivers.

The information collection and control unit is responsible for collecting which port is a registered port and which port is a non-registered port on an xDSL subscriber board, a maximum downlink service bandwidth and preset transmission mode that a registered port needs to provide, and line connection parameters of the port in Showtime state, optimizing, according to these information, a line transmit power of the registered user port, and controlling an output voltage of a power module of a line driver to supply power so that the output voltage meets a minimum undistorted power supply voltage required when all line drivers on the subscriber board perform power transmission. The power module to supply power is configured to simultaneously provide power for all line drivers on the xDSL subscriber board. The chipset is responsible for processing a digital signal and performing digital/analog conversion. The line driver is responsible for increasing a power for an analog signal provided by the chipset.

Of course, in addition to the DSLAM device, the information collection and control unit may be also configured on another network management device.

Figure 3:
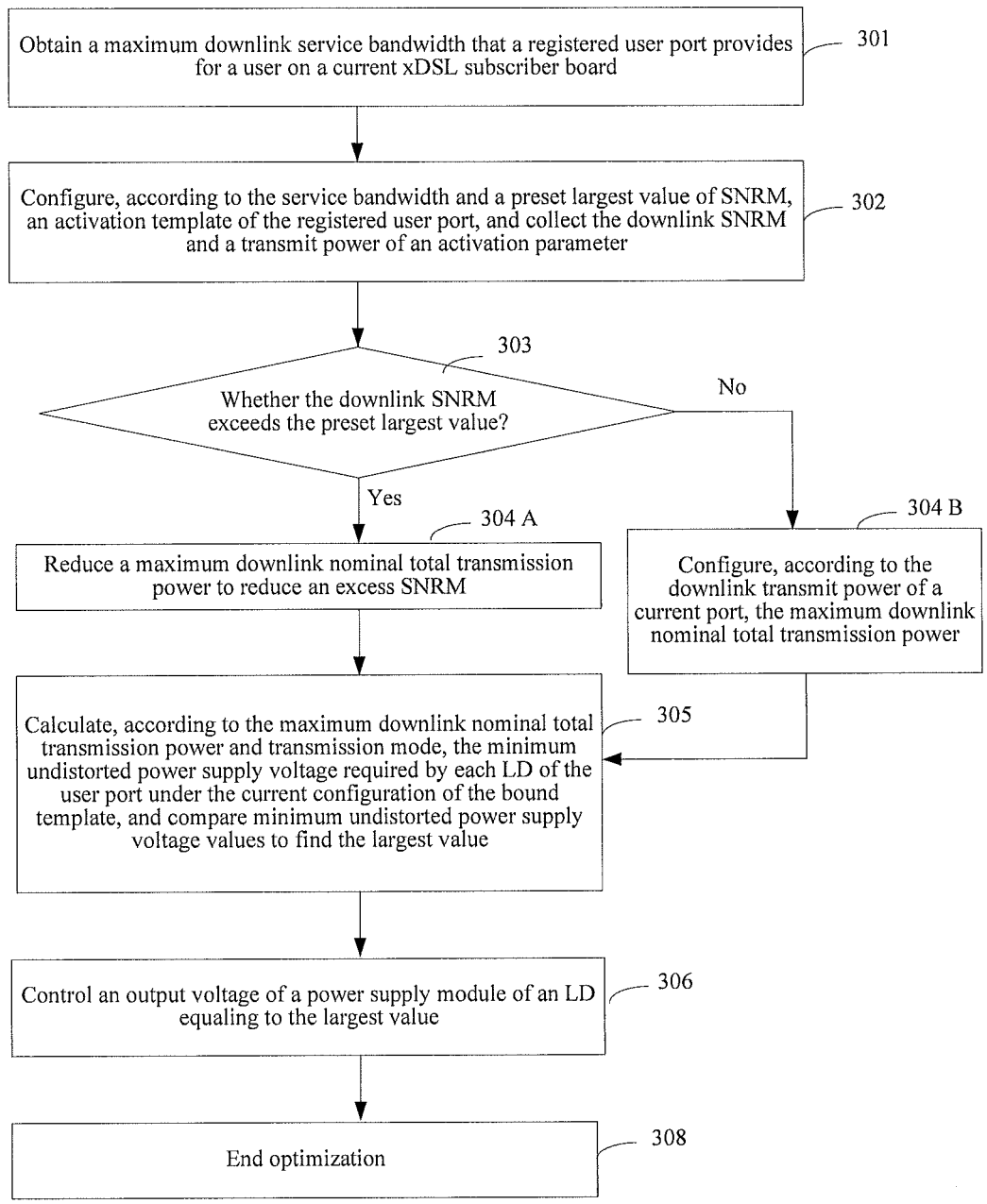
FIG. 3 is a flowchart of a method according to the present invention.

As shown in FIG. 3, the detailed process in which a DSLAM device of the present invention reduces power consumption on an xDSL subscriber board is as follows:

Step 301: Obtain a maximum downlink service bandwidth that a registered user port provides for a user on a current xDSL subscriber board through an information collection and control module.

Step 302: Configure, according to the maximum downlink service bandwidth of each user port, a preset maximum downlink SNRM, and a determined transmission mode, line and channel parameters in a template bound to each registered user port. The detailed configuration method is as follows: Configure the maximum downlink SNRM as the preset maximum downlink SNRM, and configure the maximum downlink data rate as the maximum downlink service bandwidth that the user port needs to provide for a user. The transmission mode is configured by a carrier according to a current application scenario and the maximum data rate supported by the port. Then collect the downlink SNRM and transmit power in line connection parameters of each registered user port.

Step 303: Determine whether the downlink SNRM exceeds the preset maximum downlink SNRM. If yes, perform step 304A; otherwise, perform step 304B.

Step 304A: Reduce a maximum downlink nominal total transmission power in line and channel parameters of a line port (the minimum value of the maximum downlink nominal total transmission power may be configured to 0 dBm) to reduce an excess SNRM. The excess SNRM is obtained by subtracting the preset maximum downlink SNRM from the downlink SNRM.

Step 304B: Configure, according to the downlink transmit power in line connection parameters of a current port, the maximum downlink nominal total transmission power in line and channel parameters of a template bound to the port.

Step 305: After line and channel parameters in templates bound to all current registered user ports are optimized, calculate, according to the maximum downlink nominal total transmission power and transmission mode in line and channel parameters of respective templates bound to all the registered ports on the current xDSL subscriber board, the minimum undistorted power supply voltage required by a corresponding line driver of each registered user port under the current configuration of the bound template, and compare minimum undistorted power supply voltage values, to find the largest value.

Figure 4:
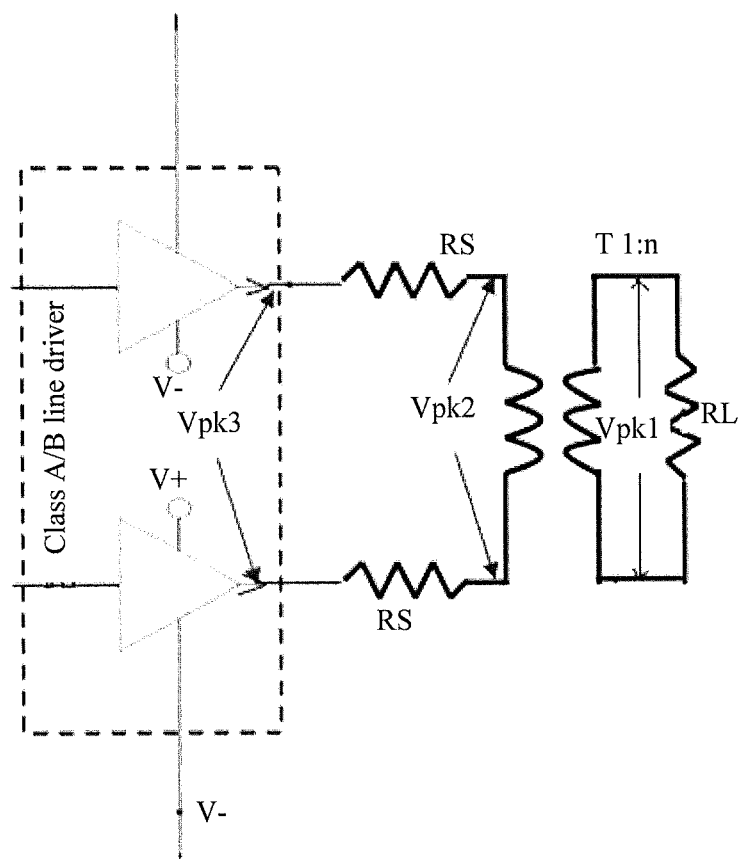
FIG. 4 is a schematic diagram of a method for calculating a minimum undistorted supply voltage according to the present invention.

Referring to FIG. 4, the process of calculating the minimum undistorted power supply voltage is as follows: First, the configuration parameter PRL (dBm) of the maximum downlink nominal total transmission power in current transmission mode on a user port is converted into the power PRL (W) on the load impedance RL:

$$P_{RL(W)} = 10^{\frac{PRL\ (dBm)}{10}} \times 0.001\ W$$

Then, in the case of the power PRL (W) on the load impedance RL, the root-mean-square voltage VRL (RMS) on the load impedance RL is calculated as:

$$V_{RL}(RMS) = \sqrt{P_{RL(W)} \times RL}$$

Note: RL is the line characteristic impedance, and the default value is 100 ohms.

Then, in the case of the root-mean-square voltage VRL (RMS) on the load impedance RL, the root-mean-square current IRL (RMS) on the load impedance RL is calculated as:

$IRL(RMS)=VRL(RMS)/RL;$

Then, the signal peak voltage Vpk1 on the load impedance RL is calculated as:

$Vpk1=VRL(RMS)*PAR;$

Note: The full name of PAR is peak-to-average ratio, that is, the ratio of the peak voltage to the average voltage. The PAR values in 17a transmission mode (one of transmission modes defined in the ITU-T standard) and ADSL transmission mode are different.

Then, the secondary signal peak voltage Vpk2 on the transformer T is calculated as:

$Vpk2=Vpk1*1/n;$

The calculation method in the embodiment ignores the power loss ratio caused by a transformer.

Then, the peak voltage Vpk3 of the output signal of a line driver is calculated as:

$Vpk3=Vpk2+2*RS*IRL(RMS)*n*PAR;$

The power supply voltage of the line driver is calculated as:

$(V+-V-)pk-=Vpk3+(1.5*2);$

The value 1.5 is the value of the line driver headroom voltage, which is expressed in volts.

Step 306: Control an output voltage of a power module of a line driver equaling to the largest value.

Step 308: End optimization.

Figure 5:
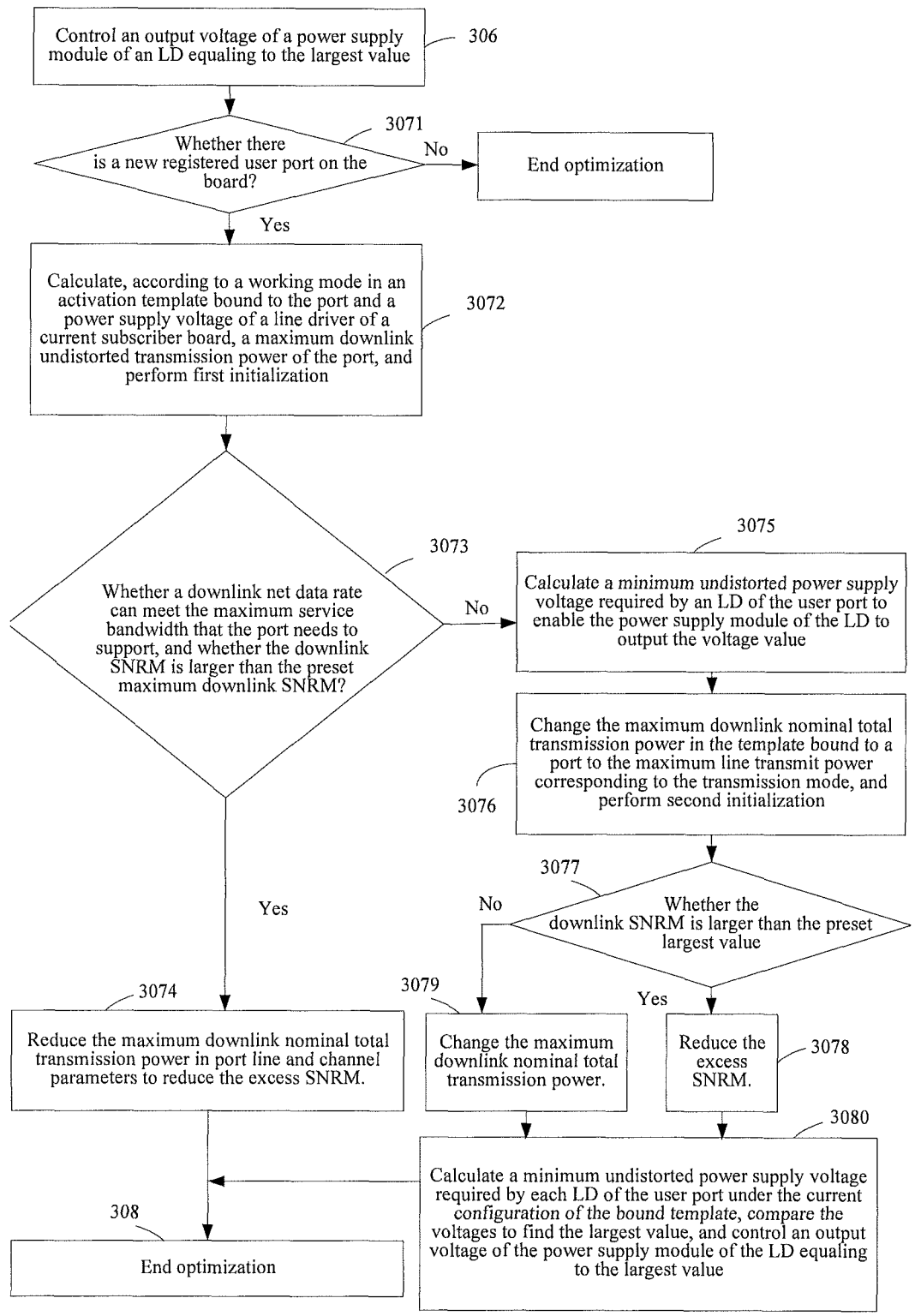
FIG. 5 is a flowchart of another embodiment of a method according to the present invention.

In addition, as shown in FIG. 5, according to actual requirements, the following steps may be performed after step 306:

Step 3071: Query whether there is a new registered user port on the xDSL subscriber board in real time through an information collection and control module. If yes, perform step 3072; otherwise, perform step 308.

Step 3072: Calculate, according to a transmission mode used by the port and an output power supply voltage of a power module of a current line driver to supply power, the maximum downlink undistorted transmission power of the port in the current situation, then obtain line and channel parameters of a template bound to the port according to the maximum downlink service bandwidth provided by the new registered port for a user and the preset maximum downlink SNRM, and perform first initialization.

Step 3073: After the port enters the Showtime state according to the foregoing template, determine whether a downlink net data rate in the line connection parameters of the port can meet the maximum service bandwidth that the port needs to support and whether the downlink SNRM is larger than the preset maximum downlink SNRM. If yes, performs step 3074; otherwise, perform step 3075.

Step 3074: When the system considers that the maximum downlink nominal total transmission power in line and channel parameters of a template bound to a port meets requirements of the port and that the maximum downlink nominal total transmission power may be reduced continuously, the line driver power supply does not need to be adjusted. The maximum downlink nominal total transmission power in line and channel parameters of a port may be reduced to reduce an excess SNRM. Then perform step 308.

Step 3075: Calculate, according to a configured transmission mode in the line and channel parameters of a template bound to the port and the maximum downlink line transmit power corresponding to the transmission mode, a minimum undistorted power supply voltage required by a line driver of the port to enable the power module of the line driver to output the voltage value, and then perform step 3076.

Step 3076: Change the maximum downlink nominal total transmission power in the template bound to a port to the maximum line transmit power corresponding to the transmission mode, perform second initialization, and then perform step 3077.

Step 3077: Collect the downlink SNRM and transmit power in current line connection parameters of the port and determine whether the downlink SNRM is larger than the preset maximum downlink SNRM. If yes, perform step 3078; otherwise, perform step 3079.

Step 3078: Reduce the configured value of the maximum downlink nominal total transmission power in line and channel parameters of the template bound to the port to reduce an excess SNRM. The excess SNRM is obtained by subtracting the preset maximum SNRM from the downlink SNRM in the line connection parameters.

Step 3079: Change, according to the downlink line transmit power in the line connection parameters of the port, the maximum downlink nominal total transmission power in line and channel parameters of the template bound to the port.

Step 3080: Calculate, according to the maximum downlink nominal total transmission power and transmission mode of a registered user port on a current subscriber board, a minimum undistorted power supply voltage required by each LD of a user port under the current configuration of the bound template, compare minimum undistorted power supply voltage values, to find the largest value, control an output voltage of the power module of the LD equaling to the largest value, and then perform step 308.

Step 308: End optimization.

In the embodiments of the present invention, when ensuring user service bandwidth requirements and line quality, a line transmit power of a registered user port on an xDSL subscriber board is optimized according to the maximum service bandwidth, transmission mode, and line connection parameters supported by the registered user port on the xDSL subscriber board, thereby reducing power consumption on the xDSL subscriber board to a maximum degree by cooperating with dynamic adjustment of a power supply voltage of a line driver.

Persons of ordinary skill in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk and the like.

The foregoing descriptions are merely specific implementation manners of the present invention, but are not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope of the claims.

The present invention discloses a method for reducing power consumption on an xDSL subscriber board, including: obtaining the maximum downlink service bandwidth that a registered user port provides for a user, the downlink signal-to-noise ratio margin in line connection parameters of the user port, and transmission mode information in a line template bound to the user port; determining whether the downlink signal-to-noise ratio margin is larger than the preset value, if yes, reducing the maximum downlink nominal total transmission power; otherwise, configuring the maximum downlink nominal total transmission power as a downlink transmit power in line connection parameters of the current port; calculating, according to the maximum downlink nominal total transmission power and transmission mode, a minimum undistorted power supply voltage required by a corresponding line driver of each registered user port under the current configuration of the bound template, comparing minimum undistorted power supply voltage values, to find the largest value; and controlling an output voltage of a power module of a line driver equaling to the largest value.

What is claimed is:

1. A method for reducing power consumption on an x digital subscriber line (xDSL) subscriber board, comprising:
obtaining a maximum downlink service bandwidth that a registered user port provides for a user, a downlink signal-to-noise ratio margin (SNRM) in line connection parameters of the user port, and transmission mode information in a line template bound to the user port, and configuring line and channel parameters in a template bound to the registered user port;
determining whether the downlink SNRM is larger than a preset value, if yes, reducing the value of a maximum downlink nominal total transmission power in the template bound to a current port to reduce an excess SNRM;
otherwise, configuring the maximum downlink nominal total transmission power in the template bound to the port as a downlink transmit power in line connection parameters of the current port;
calculating, according to the maximum downlink nominal total transmission power and transmission mode, a minimum undistorted power supply voltage required by a corresponding line driver of each registered user port under the current configuration of the template bound, and comparing the calculated minimum undistorted power supply voltage values to find a largest value; and
controlling an output voltage of a power circuit of the line driver equaling to the largest value.

2. The method according to claim 1, wherein the configuring line and channel parameters in the template bound to the registered user port comprises:
configuring a maximum downlink SNRM as a preset maximum downlink SNRM, configuring a maximum downlink data rate as the maximum downlink service bandwidth that the user port needs to provide for the user, and configuring a transmission mode by a carrier according to a current application scenario and the maximum downlink data rate supported by the user port.

3. The method according to claim 1, wherein the excess SNRM is obtained by subtracting a preset maximum downlink SNRM from the downlink SNRM in the line connection parameters.

4. The method according to claim 1, wherein after the step of controlling the output voltage of the power circuit of the line driver equaling to the largest value, further comprising:
querying whether there is a new registered user port on the xDSL subscriber board in real time through an information collection and control circuit, if yes, calculating, according to the transmission mode used by the port and the output power supply voltage of the power circuit of a current line driver to supply power, the maximum downlink undistorted transmission power of the port in a current situation, obtaining line and channel parameters of the template bound to the port according to the maximum downlink service bandwidth provided by a new registered port for the user and the preset maximum downlink SNRM, and performing first initialization.

5. The method according to claim 4, wherein after the first initialization, further comprising:
after the port enters a Showtime state according to a foregoing template, determining whether a downlink net data rate in the line connection parameters of the port can meet the maximum service bandwidth that the port needs to support and whether the downlink SNRM is larger than the preset maximum downlink SNRM, if yes, reducing the excess SNRM;
otherwise, calculating, according to a configured transmission mode in the line and channel parameters of the template bound to the port and the maximum downlink line transmit power corresponding to the transmission mode, the minimum undistorted power supply voltage required by the line driver of the port to enable the power module of the line driver to output the voltage value, and then changing the maximum downlink nominal total transmission power in the template bound to the port to the maximum line transmit power corresponding to the transmission mode and performing second initialization.

6. The method according to claim 5, wherein after completing the second initialization, further comprising:
collecting the downlink SNRM and transmit power in current line connection parameters of the port and determining whether the downlink SNRM is larger than the preset maximum downlink SNRM, if yes, reducing the configured value of the maximum downlink nominal total transmission power in line and channel parameters of the template bound to the port to reduce the excess SNRM;
otherwise, changing the maximum downlink nominal total transmission power in line and channel parameters of the template bound to the port according to the downlink line transmit power in the line connection parameters of the port; and
calculating, according to the maximum downlink nominal total transmission power and transmission mode of the registered user port on a current subscriber board, the minimum undistorted power supply voltage required by each line driver (LD) of the user port under the current configuration of the bound template, comparing minimum undistorted power supply voltage values, to find the largest value, and controlling the output voltage of the power circuit of the LD equaling to the largest value.

7. A Digital Subscriber Line Access Multiplexer (DSLAM), comprising:
a power circuit, configured to provide a power for a line driver on an x digital subscriber line (xDSL) subscriber board;
a chipset, configured to process a digital signal and perform digital/analog conversion;
a plurality of line drivers, configured to increase a power for an analog signal provided by the chipset; and
an information collection and control circuit, configured obtain a maximum downlink service bandwidth that a registered user port provides for a user, a downlink signal-to-noise ratio margin (SNRM) in line connection parameters of the user port, and transmission mode information in a line template bound to the user port, and configure line and channel parameters in a template bound to the registered user port;

determine whether the downlink SNRM is larger than a preset value, if yes, reduce the value of a maximum downlink nominal total transmission power in the template bound to a current port to reduce an excess SNRM; otherwise, configure the maximum downlink nominal total transmission power in the template bound to the port as a downlink transmit power in line connection parameters of the current port;

calculate a minimum undistorted power supply voltage required by a corresponding line driver of each registered user port under a current configuration of the bound template according to the maximum downlink nominal total transmission power and transmission mode;

compare the calculated minimum undistorted power supply voltage values to find a largest value; and control an output voltage of the power circuit of the line driver equaling to the largest value.

8. The Digital Subscriber Line Access Multiplexer according to claim 7, wherein the information collection and control circuit configures line and channel parameters in a template bound to a registered user port and determines whether the downlink SNRM is larger than the preset value, if yes, reduces a maximum downlink nominal total transmission power in a template bound to a current port to reduce the excess SNRM;

otherwise, configures the maximum downlink nominal total transmission power in the template bound to the port as the downlink transmit power in line connection parameters of the current port;

then calculates, according to the maximum downlink nominal total transmission power and transmission mode, the minimum undistorted power supply voltage required by a corresponding line driver of each registered user port under the current configuration of the bound template, compares minimum undistorted power supply voltage values, to find the largest value, and controls the output voltage of the power circuit of the line driver equaling to the largest value.

9. An x digital subscriber line (xDSL) system, comprising:
a user computer;
a Digital Subscriber Line modem;
a network management device; and
a Digital Subscriber Line Access Multiplexer, wherein the user computer is connected to the Digital Subscriber Line Access Multiplexer through the Digital Subscriber Line modem;

the network management device collects port registration on an xDSL subscriber board, a maximum service bandwidth and transmission mode that a registered port needs to provide, and line connection parameters of the port in Showtime state;

the Digital Subscriber Line Access Multiplexer optimizes is configured to obtain a maximum downlink service bandwidth that a registered user port provides for a user, a downlink signal-to-noise ratio margin (SNRM) in line connection parameters of the user port, and transmission mode information in a line template bound to the user port, and configuring line and channel parameters in a template bound to the registered user port;

determine whether the downlink SNRM is larger than a preset value, if yes, reduce the value of a maximum downlink nominal total transmission power in the template bound to a current port to reduce an excess SNRM;

otherwise, configure the maximum downlink nominal total transmission power in the template bound to the port as a downlink transmit power in line connection parameters of the current port;

calculate a minimum undistorted power supply voltage required by a corresponding line driver of each registered user port under a current configuration of the bound template according to the maximum downlink nominal total transmission power and transmission mode;

compare the calculated minimum undistorted power supply voltage values to find a largest value; and control an output voltage of a power circuit of the line driver equaling to the largest value.

* * * * *